United States Patent
Goodwin et al.

(10) Patent No.: US 8,112,591 B1
(45) Date of Patent: Feb. 7, 2012

(54) SYSTEM AND METHOD FOR DETECTION OF NON-DETERMINISTIC MEMORY ACCESS EVENTS

(75) Inventors: David Goodwin, Los Altos, CA (US); Peter Mattson, Sunnyvale, CA (US)

(73) Assignee: Calos Fund, Limited Liability Company, Dover, DE (US)

( * ) Notice: Subject to any disclaimer, the term of this patent is extended or adjusted under 35 U.S.C. 154(b) by 321 days.

(21) Appl. No.: 12/331,362

(22) Filed: Dec. 9, 2008

(51) Int. Cl.
*G06F 12/00* (2006.01)

(52) U.S. Cl. ......... 711/150; 711/147; 711/168; 711/169

(58) Field of Classification Search ............... 711/147, 711/150, 168–169
See application file for complete search history.

(56) References Cited

U.S. PATENT DOCUMENTS

2008/0005737 A1 * 1/2008 Saha et al. ................. 718/100
* cited by examiner

*Primary Examiner* — Jasmine Song

(57) ABSTRACT

A concurrent and asynchronous system may be managed by monitoring the performance of a plurality of operations that access a designated region of memory. In that region of memory, an occurrence of a potentially non-deterministic event can be detected when at least one of the operations is a write operation. The occurrence of the potentially non-deterministic event may then be recorded.

17 Claims, 6 Drawing Sheets

SYSTEM AND METHOD FOR DETECTION OF NON-DETERMINISTIC MEMORY ACCESS EVENTS

TECHNICAL FIELD

The disclosed embodiments relate to a system and method that detect non-deterministic memory access events. More particularly, the disclosed embodiments relate to a system and method for detecting non-deterministic memory access events in a concurrent, asynchronous system using buffer representations.

BACKGROUND

For a large class of computationally intensive applications, there is a requirement that concurrent tasks be able to simultaneously and non-synchronously access a common region of memory in a manner that does not introduce non-determinism. For low-level languages, such as assembly and C, typically used for computationally intensive applications, it is not generally possible to statically determine if a set of concurrent tasks will access memory in a potentially non-deterministic manner. There is a need for a system that allows concurrent, asynchronous access to a region of memory in a manner that enables the detection of possible non-deterministic behavior.

DETAILED DESCRIPTION

Figure 1:
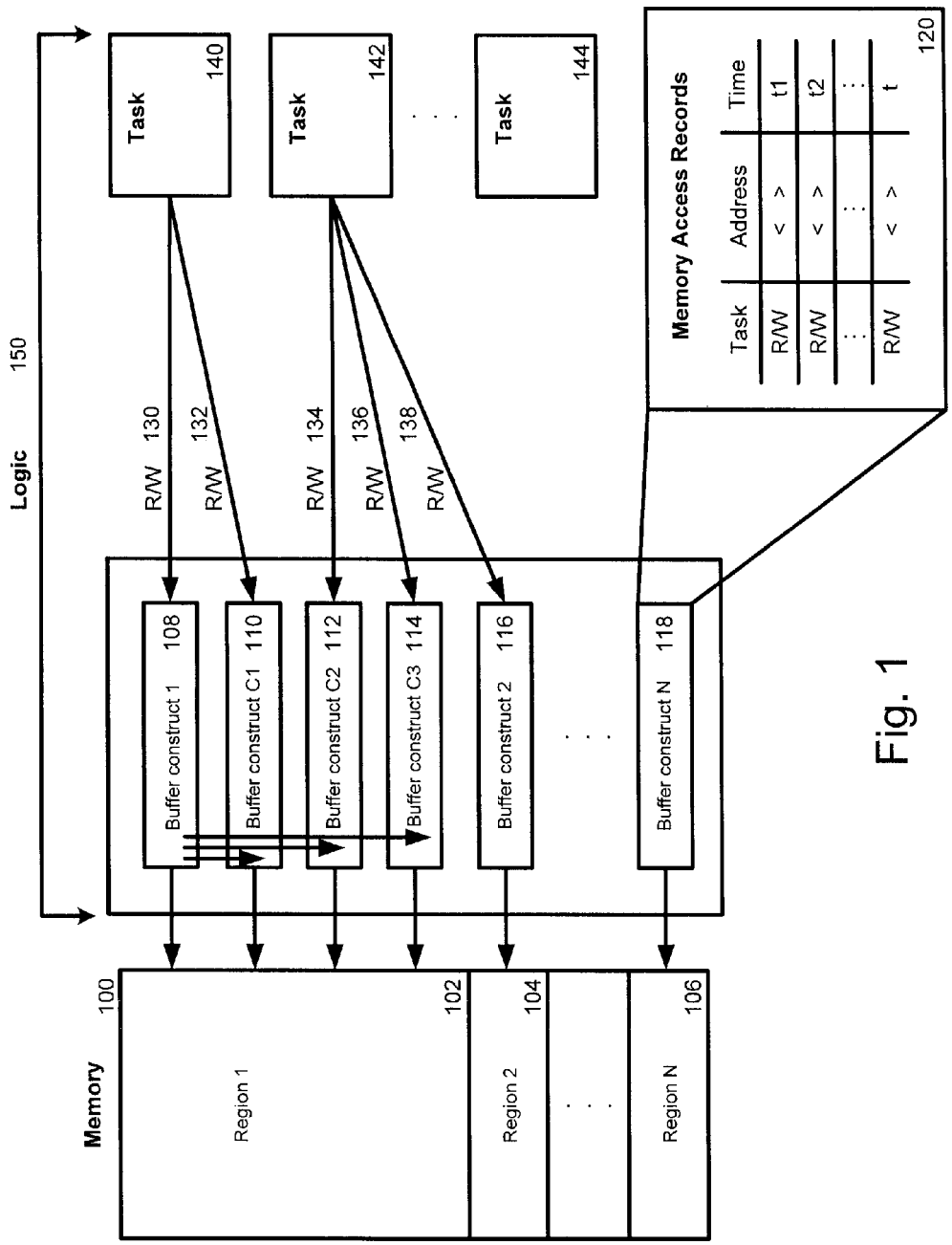
FIG. 1 illustrates a system for detecting and handling occurrence of potentially non-deterministic memory access events, under an embodiment.

According to an embodiment, a system is provided that uses a data structure, in form of a buffer construct, to manage memory access operations of multiple tasks in a concurrent and asynchronous environment. The types of memory access operations that may be managed include, for example, read and write operations. As described below, buffer constructs may be implemented that represent a region of memory that is accessed by the operations of the concurrent and asynchronous environment. According to an embodiment, an occurrence of a potentially non-deterministic event may be detected when two or more concurrent and asynchronous operations, of which at least one is a write operation, access the region of memory.

Embodiments provide that each buffer construct includes memory access records, and these records are compared to determine whether the portion of the region of memory accessed by each concurrent and asynchronous operation overlaps. If an overlap occurs, the occurrence of a potentially non-deterministic event can be detected. Once detected, some form of corrective action may take place. For example, the occurrence of the potentially non-deterministic event may be recorded (i.e. memorialized or marked), and an error notification corresponding to the instance may be generated.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Architecture

FIG. 1 illustrates a system for detecting and handling the occurrence of potentially non-deterministic memory access events, under an embodiment of the invention. The system includes memory 100 and logic 150 to create and use buffer constructs 108-118. The buffer constructs 108-118 include data that identifies or points to specific portions of memory 100. These portions may be identified by, for example, memory addresses. Additionally, one or more embodiments provide that the buffer constructs include state information, indicating an operative state of each portion of the memory (as, for example, identified by a set of memory addresses). In an operative environment, the buffer constructs 108-118 may be created when the logic 150 is implemented as part of one or more tasks 140-144. The system also maintains and manages memory access records 120. By using the buffer construct(s) and memory access records, the system is able to detect the occurrence of potentially non-deterministic memory access events when one or more tasks access the memory.

In one embodiment, the tasks 140, 142, 144 are assigned an operator that corresponds to a digital signal processor (DSP). Alternatively, the operator may correspond to a processor that is configured to perform parallel processing. The memory 100 may be allocated into different regions, referenced in FIG. 1 as Region 1 102, Region 2 104 and Region N 106. Each task 140, 142, 144 may correspond to execution of a set of high-level programming instruction. For example, in the field of video processing, a task may correspond to a set of instructions for decoding or for video enhancement. At run time, each memory region 102-106 is represented by one of the buffer constructs.

In one embodiment, buffer construct 1 108 includes a set of pointers to Region 1 102, buffer construct 2 116 includes a set of pointers to Region 2 104 and buffer construct N 118 includes a set of pointers to Region N 106. Each buffer construct includes state information (as well as other data not explicitly discussed). As an addition or alternative, each buffer construct includes or is associated with memory access records 120. The memory access records 120 includes data that identifies different task operations that are assigned to specific portions of memory 100. In some implementations, the memory access records 120 may also include information that identifies the timing of individual task operations, and the memory locations (as identified by addresses) that are accessed in memory 100 by each task operation. However, as described below, embodiments described herein may be implemented without use of timing information as part of the memory access records.

Each task 140, 142 and 144 may comprise of instructions that include operations requiring use of data from the region of memory that is represented by the buffer construct. In one implementation, each task is constructed to achieve certain outcomes, using resources that include external memory (containing the region of memory) and/or low-level processors. As mentioned above, for example, a task may be constructed to perform a type of video processing, such as video enhancement. For such outcomes, a corresponding task may be constructed to first read video data from one region of memory, scale the data, and then write the new video data into the region of the memory. In a concurrent and asynchronous environment, another task may require access to the region of memory (e.g., task to enhance video). If the second task's access is mistimed, non-deterministic results are possible. Accordingly, embodiments described herein monitor against multiple tasks accessing the same region of memory in a manner that has potentially non-deterministic results.

In an embodiment, each buffer construct 108-118 is controlled (i.e. 'owned') by a single task. The task with ownership of the buffer construct is able to after the state information of the buffer construct and transfer ownership of the buffer construct to another task. Each task 140-144 may use the buffer construct in connection with a read operation or a write operation to the region of memory that is represented by the buffer construct. In an embodiment, each task 140-144 is also constructed to generate clone buffer constructs when necessary. Such cloned buffer constructs may be used as with other buffer constructs, in that the task may own the cloned buffer construct and have ability to designate the state of the buffer construct, as well as the ability to send or communicate that buffer construct to another task. Thus, a cloned buffer construct may be identical to an ancestor buffer construct. As an example, a first task may create a clone of the buffer construct that represents a region of memory when a second task is instructed to concurrently access the same region of memory. Once the first task clones the buffer construct, it can send the cloned buffer construct to the second task to enable concurrent operations to that same region of memory. As described below, cloned buffer constructs may be merged as part of the process to detect when the memory access operations of the different tasks result in potential non-determinism. A cloned buffer construct may be merged with another cloned buffer construct and/or its ancestor buffer construct, as necessary to merge all pertinent buffer constructs.

With reference to an embodiment of FIG. 1, buffer construct C1 110 is shown to be a clone of buffer construct 1 108. Similarly, buffer construct C2 112 and buffer construct C3 114 are also clones of buffer construct 1 108. As discussed above, a single task may own multiple clones of the same buffer construct. As an alternative, the single task may own multiple buffer constructs that each represent a different region of memory. In FIG. 1, a run-time environment is depicted in which multiple cloning operations are performed. For example, task 140 has instructions to perform a read operation 130 to Region 1 102 and a concurrent write operation 132 to Region 1 102 as well. Because a buffer construct is owned by task 140 (and no other task), the task 140 is configured to clone buffer construct 1 108 to create buffer construct C1 110. Task 140 may concurrently own buffer construct C1 110 to perform a write operation 132 to Region 1 102.

Similarly, in the example depicted by FIG. 1, task 142 may receive instructions to perform a read operation 134 to Region 1 102, a read operation 136 to Region 1 102, and a write operation 138 to Region 2 104. However, because task 140 is accessing Region 1 102 using buffer construct 1 108 and buffer construct C1 110, task 140 must clone buffer construct 1 108 again so that task 142 may access Region 1 102. As such, task 140 receives instructions to clone buffer construct 1 twice, to create buffer construct C2 112 and buffer construct C3 114. The task 140 sends these two cloned buffer constructs to task 142, and task 142 may therefore access Region 1 102. Task 142 simultaneously owns buffer construct 2 116 and performs a write operation 138 to Region 2. No clone operation instruction is necessary to access Region 2 because only one task is currently accessing the region.

Applying FIG. 1 to the example mentioned above, task 142 may correspond to a component of a video processing platform. The task may be configured, for example, to scale or enhance video data found in Region 1 102 and write the new data to Region 2 104. In such an implementation, the task 142 controls performance of read operation 134 using buffer construct C2 112, resulting in a large amount of video data being read from Region 1 102. The video data may then be processed. For example, the video data may be written to Region 2 104 by performing a write operation 138 using buffer construct 2 116.

As the different regions of memory are accessed by tasks (which are concurrently executed), one or more embodiments provide that the information regarding memory access events are recorded in the memory access records 120. In some implementations, the memory access records 120 each include timing information, corresponding to instances when a read or write operation occurred to the region of memory. The memory access records 120 may also record the memory addresses of the read or write operation. As an alternative or addition to using timing information, the memory access records may identify or note an ancestor buffer construct from which other buffer constructs that are to be merged can be compared against. The information found in the memory access records 120 may be used to monitor performance of concurrent and asynchronous operations, specifically to detect an occurrence of a potentially non-deterministic event.

Methodolody

Figure 2:
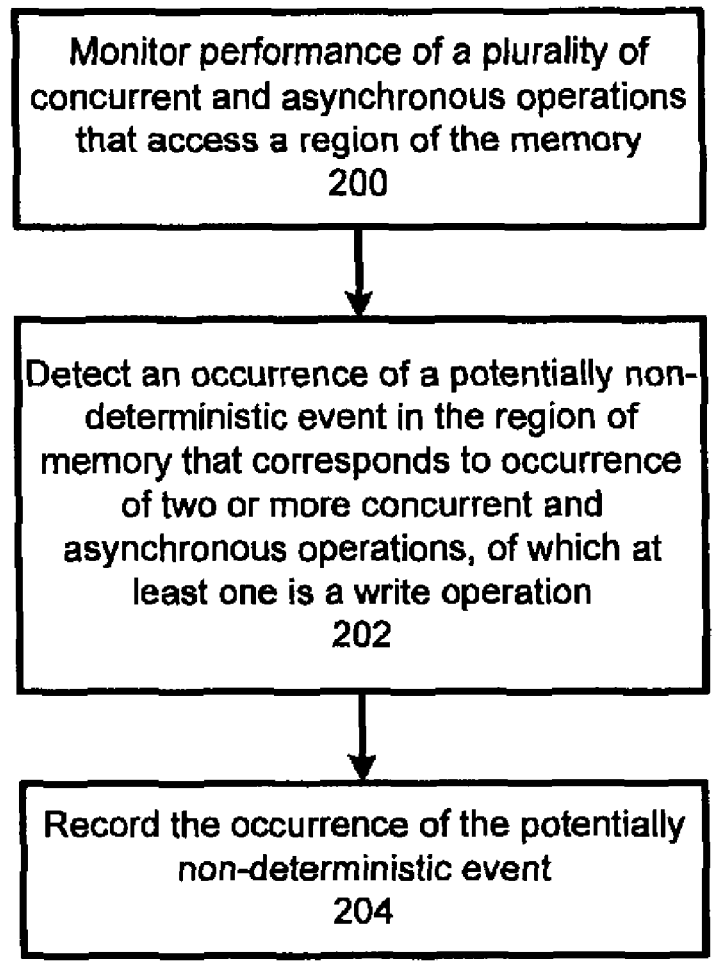
FIG. 2 illustrates a method for detecting and handling occurrence of potentially non-deterministic memory access events, under an embodiment.

FIG. 2 illustrates a method for detecting and handling the occurrence of potentially non-deterministic memory access events, under an embodiment. According to an embodiment, a method such as described may be implemented programmatically, using components or elements such as described with an embodiment of FIG. 1. Accordingly, reference may be made to elements of FIG. 1 for purpose of illustrating a suitable element or component for performing a step or sub-step being described.

In a step 200, a plurality of concurrent and asynchronous tasks are initiated. Each task may be executed to control one or more operations that individually access a region of memory. The performance of the task, as well as other steps described with this method, may be implemented using logic (e.g. distributed logic 150) such as described above. In one implementation, the logic 150 is functionally incorporated with the run-time execution of a task or task operation. As explained above, for example, a system may be configured at run-time to monitor a plurality of concurrent and asynchronous operations using buffer constructs. If, for example, task 140 performs read operation 130 and a concurrent write operation 132 to Region 1 102, buffer construct 1 108 is cloned to create buffer construct C1 110 so that the task 140 is able to write to Region 1 102. Logic 150 may monitor when buffer constructs are either cloned or newly created. In this way, a plurality of concurrent and asynchronous operations that access a region of memory may be monitored by monitoring the creation of buffer constructs.

At step 202, an occurrence of a potentially non-deterministic event is detected in the region of memory. This event may be triggered by occurrence of two or more concurrent and asynchronous operations, of which at least one is a write operation. The occurrence of a potentially non-deterministic event depends on the type of operations accessing the region of memory. For example, if two read operations (i) are performed at the same region of memory, and (ii) occur concurrently and asynchronously, no potential non-deterministic event exists, as the read operations do not alter the data in the memory. But write operations do alter the data in the memory. If two asynchronous and concurrent operations correspond to (i) two write operations, or (ii) one write operation followed by one read operation, then the first write operation may change data needed or used by the second operation. This is potentially non-deterministic. Such an example illustrates how a potentially non-deterministic event occurs when at least one of the two or more concurrent asynchronous operations is a write operation.

In one embodiment, memory access records of the buffer constructs are monitored to detect the occurrence of a potentially non-deterministic event. Referring back to FIG. 1, when task 140 reads from Region 1 102 using buffer construct 1 108, the memory access records 120 for buffer construct 1 108 records the memory address accessed by the read operation 130 during a specified time period. When task 142 concurrently writes to Region 1 102 using buffer construct C2 112, the memory address records 120 for buffer construct C2 112 records the memory address accessed by the write operation 134 during the specified time period. The result is that two buffer constructs are concurrently used to access the same region of memory.

Embodiments provide that a merge operation is then performed to combine two or more buffer constructs into one buffer construct. The performance of the merge operation offsets any preceding clone operation. During a merge operation, the memory access records of the cloned buffer constructs are combined into one set of memory access records. In one implementation, buffer construct 1 108 and buffer construct C1 110 are merged so that one merged buffer construct remains. The merge operation may be performed after the buffer constructs are no longer being used to access the memory.

At merge time, an embodiment provides that an occurrence of a potentially non-deterministic event is detected by comparing a portion of the region of memory accessed by the concurrent operations. In one embodiment, the portion of the region of memory is defined by a set of memory addresses. The merge operation combines the memory access records of the cloned buffer constructs into one set of memory access records. Once the memory access records are combined, the memory addresses accessed by the concurrent operations are compared with each other to determine whether an overlap occurs. If an overlap occurs, logic 150 detects the occurrence of a potentially non-deterministic event. With reference to an embodiment of FIG. 1, the memory addresses accessed by the read operation 130 and the write operation 134 may be compared in order to make the determination as to whether the memory addresses accessed by each operation overlap. If the two concurrent operations, in which one of the operations is a write operation, access the same memory addresses, a non-deterministic event may be deemed possible.

As an alternative or addition one implementation, the memory access records of two buffer constructs that are clones are compared against that of an ancestor to determine if the two buffer constructs accessed a common range of memory addresses. Such a comparison may form the basis of a determination of non-determinism. No timing information may be needed in such an implementation.

At step 204, the occurrence of the potentially non-deterministic event is recorded or acted upon. In one embodiment, a program or system implementing a method such as described may record the occurrence by generating an error notification. The system can then notify the user that an error exists.

Figure 3:
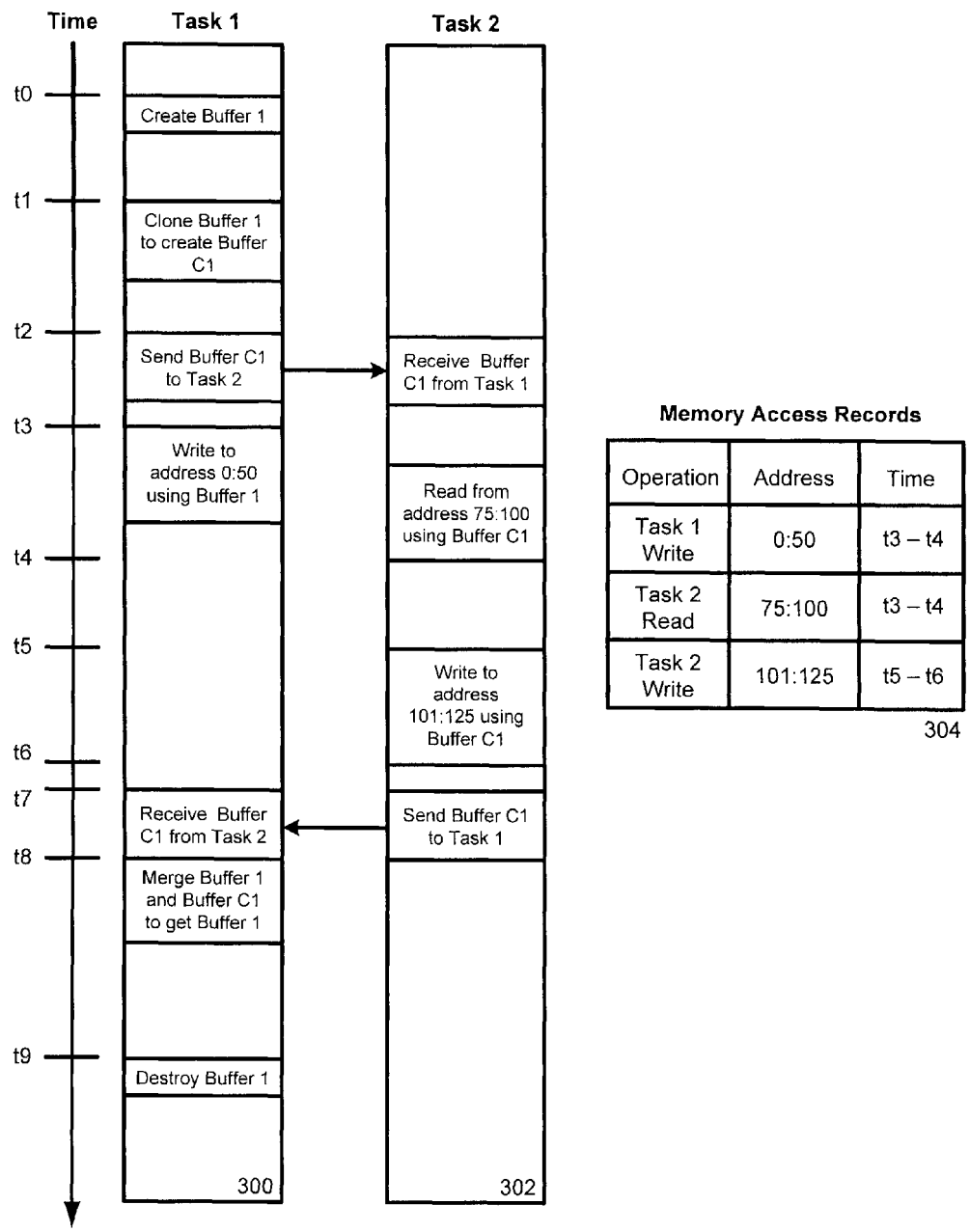
FIG. 3 is an illustrative timeline of an event that has no potentially non-deterministic event.
Figure 4:
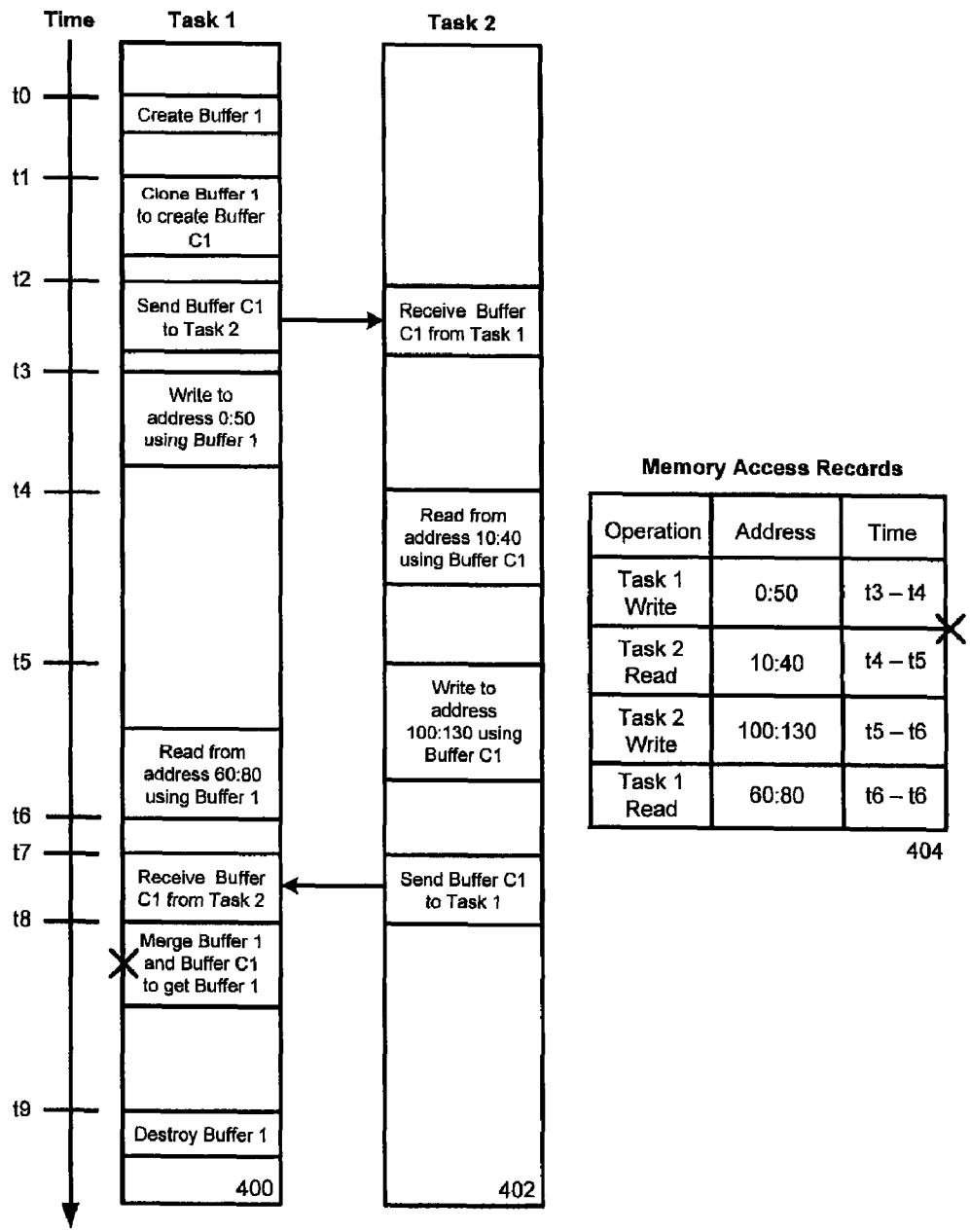
FIG. 4 is an illustrative timeline of an event that has a potentially non-deterministic event.
Figure 5:
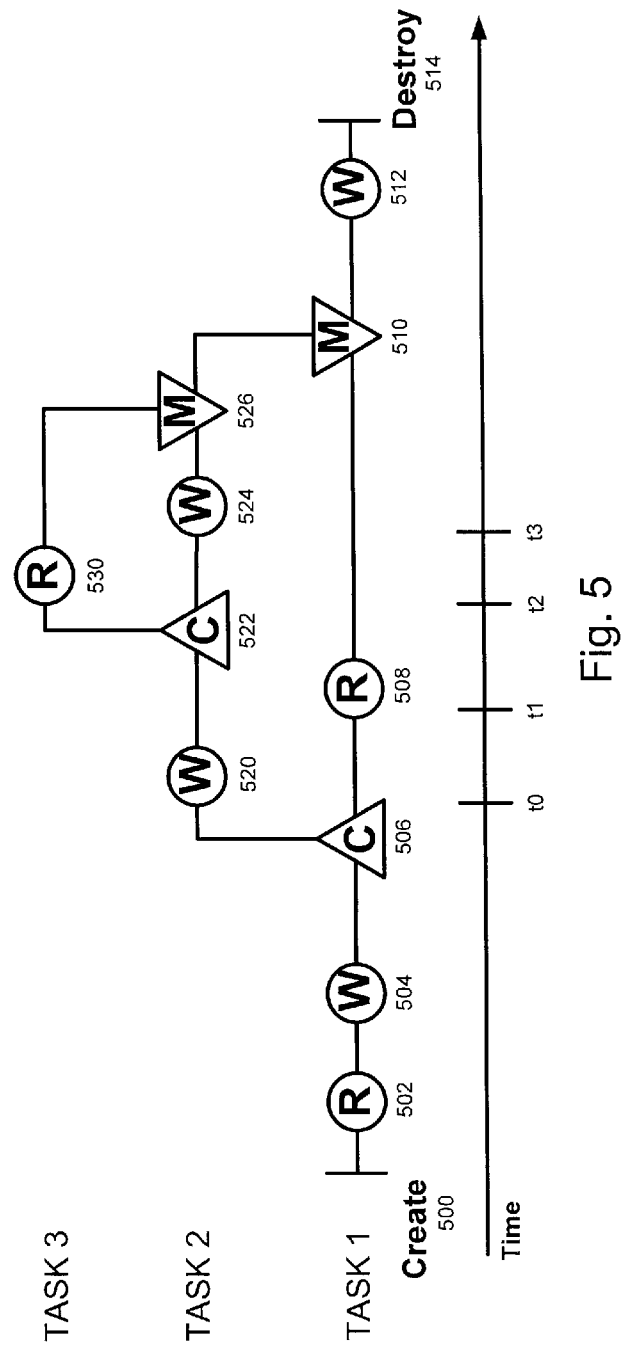
FIG. 5 is an illustrative timeline of the method for detecting and handling occurrence of potentially non-deterministic memory access events.

FIG. 3 through FIG. 5 illustrate time-line sequence diagrams of one or more embodiments. In describing such embodiments, reference may be made to elements of FIG. 1 for purpose of illustrating a suitable component for providing a function or feature being described.

FIG. 3 is an illustrative timeline of an event that is not potentially non-deterministic. In one depicted scenario, task 1 and task 2 are executed concurrently and require access to the same region of memory: Region 1. In one embodiment, both tasks are run by the same processor. In another embodiment, multiple tasks may be run by multiple processors. In embodiments where multiple processors access the same region of memory, a task run by one processor and a concurrent task run by another processor may perform concurrent operations.

FIG. 3 illustrates an implementation in which multiple processors access Region 1 of the memory. Task 1 may be operated by a first processor and task 2 may be operated by a second processor. The different boxes within the task boxes 300, 302 represent different instructions that each task is designed to perform. At time t0, task 1 creates buffer construct 1 that represents Region 1. Task 1 may now access Region 1 using buffer construct 1. At time t1, task 1 clones buffer construct 1 to create buffer construct C1. At time t2, task 1 sends the buffer construct C1 to task 2. In response, task 2 receives buffer construct C1 from task 1 so that it can access Region 1 concurrently.

At time t3, task 1 begins a write operation to Region 1 by using buffer construct 1. In this example, task 1 writes data to memory address location 0:50. Sometime between time t3 and time t4, task 2 begins a read operation to Region 1 by using buffer construct C1 at time t4. Task 2 reads data from memory address location 75:100. Once the read operation is completed, task 2 uses buffer construct C1 to access Region 1 again. At time t5, task 2 performs a write operation to memory address location 101:125. Once the write operation is completed, task 2 has no more instructions to perform any more operations to Region 1. Therefore, task 2 is instructed to send buffer construct C1 back to task 1 since it has finished accessing the memory.

At time t7, task 1 receives buffer construct C1 from task 2 and at time t8, task 1 performs a merge operation. As mentioned above, the merge operation (i) combines the memory access records (of the buffer constructs being merged) into one set of memory access records, (ii) compares the different memory addresses to determine whether an overlap occurs, and (iii) combines the buffer constructs into one. In this example, at merge time, the memory access records for buffer construct 1 and buffer construct C1 are combined into the one set of memory access records 304. The memory access records 304 show the combined memory access records representing the memory address accessed and the time the operations took place. Furthermore, during the merge operation, task 1 compares the memory addresses accessed by both task 1 and task 2 to determine whether an overlap occurs.

As discussed above in an embodiment, the memory access records contains information regarding the operations that are assigned to each region of memory as well as the timing and address location accessed on the region of memory. The memory access records 304 show that at a time between t3-t4, task 1 performed a write operation to memory address 0:50. Concurrently (i.e. during the same time period t3-t4), task 2 performed a read operation to memory address 75:100. Although task 1 and task 2 are concurrent tasks and both tasks performed concurrent operations to Region 1, because there was no overlap in the memory address accessed by the write and read operations, there is no potentially non-deterministic event. Similarly, task 2 performed a write operation to memory address 101:125, and since there was no overlap in the memory address accessed by this write operation and the previous operations, there is no potentially non-deterministic event.

After a task no longer needs a buffer construct to access a region of memory, it may destroy the buffer construct. The performance of the destroy buffer operation offsets the preceding create buffer operation. FIG. 3 illustrates the destroy buffer operation. After the tasks finish accessing Region 1, at time t9, task 1 destroys buffer construct 1.

FIG. 4 is an illustrative timeline of an event that is potentially non-deterministic, according to one or more embodiments. In this example, task 1 and task 2 are assumed executed at run-time. Like previous examples and implementations, both tasks may be assumed to access the same region of memory: Region 1. The different boxes within the task boxes 400, 402 represent different instructions that each task is designed to perform. At time t0, task 1 creates buffer construct 1 that represents Region 1. Task 1 accesses Region 1 by using this buffer construct 1. At time t1, task 1 clones buffer construct 1 to create buffer construct C1. At time t2, task 1 sends buffer construct C1 to task 2. In response, task 2 receives buffer construct C1 so that it can access Region 1 concurrently.

At time t3, task 1 begins a write operation to Region 1 by using buffer construct 1. The write operation writes data to memory address location 0:50. At time t4, task 2 begins a read operation to Region 1 by using buffer construct C1. Task 2 reads data from memory address location 10:40. During a time period t5-t6, (i) task 2 performs a second operation to Region 1, corresponding to a write operation, using buffer construct C1, and (ii) task 1 performs a read operation from memory address 60:80. Task 2 writes data to memory address location 100:130.

At time t7, task 2 sends buffer construct C1 back to task 1. Task 1 then performs a merge operation at time t8. Buffer construct 1 and buffer construct C1 are merged into buffer construct 1. The memory address records of buffer construct 1 and the memory address records of buffer construct C1 are combined into one.

Furthermore, during the merge operation, the memory addresses accessed are compared to detect an occurrence of a potentially non-deterministic event. Memory access records 404 shows the combined memory access records from which a comparison can be made. The memory access records 404 show that at a time period t3-t4, task 1 performed a write operation to memory address location 0:50. At a time between t4-t5, task 2 performs a read operation to memory address 10:40. Because there is an overlap in the memory address accessed by the two operations, a potentially non-deterministic event has occurred. The detection of this event is recorded. Corrective action may then be taken (e.g. error notification).

During a time period t5-t6, task 2 performed a write operation to memory address 100:130 and task 1 performed a read operation to memory address 60:80. Because the memory addresses accessed by these two operations do not overlap with the previous memory addresses accessed, no potentially non-deterministic event is determined. However, because a potentially non-deterministic event occurred between time t3-t5, the system may record the occurrence of this event as a potentially non-deterministic error. An appropriate notification may be generated.

As described above, in one embodiment, the system is capable of detecting an occurrence of a potentially non-deterministic memory access event when two operations are occurring simultaneously. For example, referring back to FIG. 4, if task 1 performed a read operation from address 100:120 instead of address 60:80 during a time period t5-t6, a potentially non-deterministic event would be detected at merge time.

FIG. 5 is an illustrative timeline of the method for detecting and handling occurrence of potentially non-deterministic memory access events, according to an embodiment. FIG. 5 illustrates an example to further clarify how the clone and merge operations work when multiple tasks are present. In a scenario that is depicted, the read and write operations are performed to the same region of memory: Region 1. Depending on the architecture implemented, multiple tasks to access a common region of memory may be executed from a single processor or from multiple processors. First, task 1 creates a buffer construct that represents Region 1. Task 1 performs a read operation 502 and a subsequent write operation 504. At this point, only one buffer construct is in use because there are no concurrent operations. Task 1 can hold onto the buffer construct as long as it needs so that it may continue to access Region 1.

Next, task 2 executes to perform a write operation 520 to Region 1. Because task 1 already owns the buffer construct to access Region 1, task 1 executes to (i) clone the buffer construct and (ii) send the first cloned buffer construct to task 2. Therefore, task 1 performs a cloning operation 506, sends the first cloned buffer construct to task 2, and task 2 then performs a write operation 520 at time t0.

Task 1 and task 2 now each own a buffer construct to Region 1 of the memory. Using the buffer constructs, each task may continue to control operations to access Region 1. At time t1, task 1 performs a read operation 508 using the original buffer construct. When task 3 initiates read operation 530, either task 1 or task 2 may perform a clone operation 522 on the buffer construct. In this example, task 2 performs the clone operation 522, so that task 3 may access Region 1.

The cloning operation 522 clones the first cloned buffer construct owned by task 2 to create the second cloned buffer construct. At this point, the example shown provides for three buffer constructs that are clones. Task 2 sends the second cloned buffer construct to task 3, and task 3 performs a read operation 530 at time t2. Subsequently, task 2 performs a write operation 524 to Region 1 at time t3 using the first cloned buffer construct it owns.

With further reference to a timeline depicted in FIG. 5, task 3 no longer has any more instructions to access Region 1. As a result, task 3 sends the second cloned buffer construct back to task 2. Task 2 receives the second cloned buffer construct and performs a merge operation 526. By performing the merge operation 526, only one buffer construct remains (e.g. the first cloned buffer construct). As discussed above, the merge operation combines the memory access records of the buffer constructs into one set of memory access records. Merge operation 526 combines the memory access records of the first cloned buffer construct and the memory access records of the second cloned buffer construct. The merge operation also compares the memory addresses accessed by each task. Accordingly, during the merge operation 526, the portions of memory accessed by the read operation 530 and by the write operations 524 respectively, are combined and compared. If the memory addresses accessed by these operations overlap, then a potentially non-deterministic memory event has been determined occurred. The system records the occurrence of this event. A notification of the event may then be generated.

After the merge operation 526, task 2 no longer controls operations to access Region 1. Task 2 sends the first cloned buffer construct back to task 1. Task 1 receives the first cloned buffer construct from task 2 and performs a merge operation 510. The memory access records of the buffer construct owned by task 2 and the memory access records of the original buffer construct are then combined and compared. If the memory addresses accessed by read operation 508 overlap with or write operation 524, then a non-deterministic memory event is deemed possible. The system again records the occurrence of this event and may generate a corresponding notification.

During the merge operation 510, the read operation 502 and write operation 504 are not considered. This is because task 1 performed these two operations before there were any other concurrent tasks.

As discussed above, the performance of the merge operation offsets the preceding clone operation. As illustrated in FIG. 5, for every merge operation, there was a preceding clone operation. Similarly, task 1 may receive a final instruction to destroy the original buffer construct to offset creation of the original buffer construct.

Hardware Diagram

Figure 6:
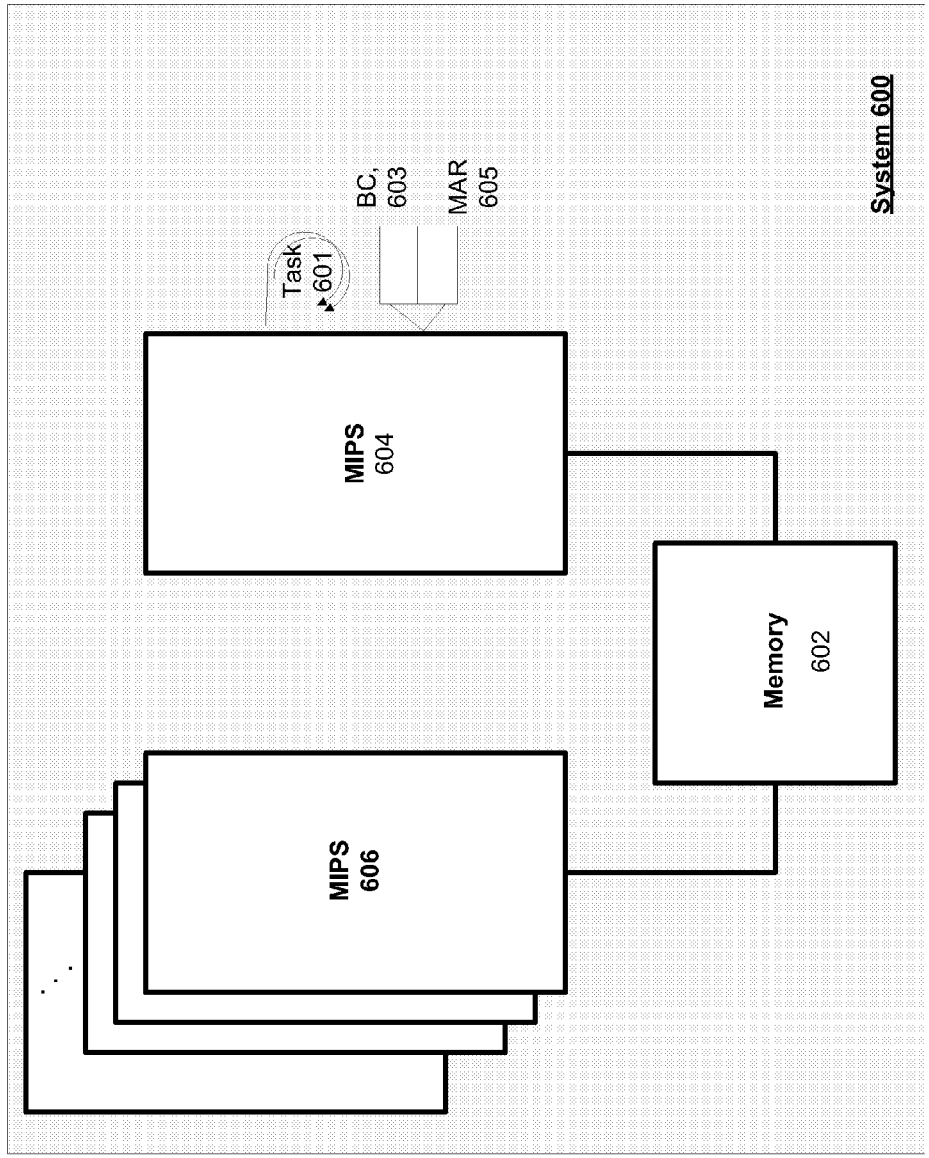
FIG. 6 is an illustrative hardware system for detecting and handling occurrence of potentially non-deterministic memory access events.

FIG. 6 is a hardware diagram of a system on which one or more embodiments may be implemented. In an embodiment, a system 600 implements multiple processors and memory resources to perform tasks concurrently and are in parallel. It is the performance of concurrent/parallel tasks where issues of non-determinism can potentially arise. Accordingly, FIG. 6 includes memory 602 and a plurality of multiple high-level processors, depicted in FIG. 6 as MIPS 604 and MIPS 606. The memory 602 may correspond to, for example, dynamic RAM, static RAM, Flash memory (including mass storage drive), hard disk device, or any other memory device that is suitable to support memory access operations such as described. The system 600 enables the MIPS 604 (which is representative of other MIPS 606, if used) to create tasks 601, as discussed above, to perform operations (e.g. read or write) requiring access to regions of memory 602. The MIPS may enable the use of multiple concurrently performed tasks through use of buffer constructs 603 (as created by tasks) and memory access records 605. Logic (e.g. distributed logic 150 of FIG. 1) may be programmed into the MIPS to use the buffer constructs 603 and memory access records to detect instances of potential non-determinism when tasks 601 are performed.

With reference to FIG. 1, multiple tasks may be implemented on one or more processors. Multiples tasks may be executed on one processor, or multiple tasks may be executed on multiple processors (where each task is executed on a separate processor). Issues of non-determinism can arise in both types of architecture. With references to FIGS. 1-5, embodiments for detecting potential non-determinism may be implemented in a single processor architecture that executes tasks with logic for buffer constructs. As an addition or alternative, the embodiments for detecting potential non-determinism may be implemented in a multiple processor architecture. Depending on the architecture and/or implementation, operations that can be performed by multiple tasks and arise to non-determinism may be performed simultaneously or concurrently.

CONCLUSION

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method to manage a concurrent, asynchronous system, the method being implemented by one or more processors that are associated with a memory, wherein the method comprises:

monitoring performance of a plurality of concurrent and asynchronous operations that access one of a plurality of designated regions of the memory;

detecting an occurrence of a potentially non-deterministic event in an accessed region of memory that corresponds to occurrence of two or more concurrent and asynchronous operations, of which at least one is a write operation; and recording the occurrence of the potentially non-deterministic event.

2. The method of claim 1, wherein recording the occurrence of the potentially non-deterministic event includes generating an error notification.

3. The method of claim 1, wherein monitoring performance of a plurality of concurrent and asynchronous operations includes monitoring one or more buffer constructs that represent the accessed region of memory; and wherein the one or more processors are configured to detect an occurrence of a potentially non-deterministic event by comparing, during a merge operation that follows one or more prior clone operations, memory addresses accessed by each concurrent and asynchronous operation in the accessed region of memory in order to make a determination as to whether the memory addresses accessed by each concurrent and asynchronous operation overlap in the accessed region of memory; wherein each clone operation generates a clone of a corresponding buffer construct that represents the accessed region of memory, and each merge operation merges at least the clone and the corresponding buffer construct so that a merged buffer construct exists after the merge operation.

4. The method of claim 1, wherein monitoring performance of a plurality of concurrent and asynchronous operations includes executing logic associated with one or more tasks that generate the plurality of concurrent and asynchronous operations.

5. The method of claim 1, wherein detecting an occurrence of a potentially non-deterministic event includes executing logic associated with one or more buffer constructs to detect the occurrence.

6. The method of claim 1, wherein detecting an occurrence of a potentially non-deterministic event includes detecting occurrence of two concurrent and asynchronous operations that include a write operation and a read operation.

7. The method of claim 1, wherein detecting an occurrence of a potentially non-deterministic event includes detecting occurrence of two concurrent and asynchronous operations that include two or more write operations.

8. A computer system configured to detect potential non-deterministic memory accesses, the system comprising:

one or more processors configured to:
monitor performance of a plurality of concurrent and asynchronous operations that access a region of memory;
detect an occurrence of a potentially non-deterministic event in the region of memory that corresponds to occurrence of two or more concurrent and asynchronous operations, of which at least one is a write operation; and
record the occurrence of the potentially non-deterministic event.

9. The computer system of claim 8, wherein the one or more processors are configured to record the occurrence of the potentially non-deterministic event by generating an error notification.

10. The computer system of claim 8, wherein the one or more processors are configured to monitor performance of a plurality of concurrent and asynchronous operations by monitoring one or more buffer constructs that represent the region of memory; and wherein the one or more processors are configured to detect an occurrence of a potentially non-deterministic event by comparing, during a merge operation that follows one or more prior clone operations, memory addresses accessed by each concurrent and asynchronous operation in the region of memory in order to make a determination as to whether the memory addresses accessed by each concurrent and asynchronous operation overlap in the region of memory; wherein each clone operation generates a clone of a corresponding buffer construct that represents the region of memory, and each merge operation merges at least the clone and the corresponding buffer construct so that a merged buffer construct exists after the merge operation.

11. The computer system of claim 8, wherein the one or more processors are configured to monitor performance of a plurality of concurrent and asynchronous operations by executing logic associated with one or more tasks that generate the plurality of concurrent and asynchronous operations.

12. A computer system configured to detect potential non-deterministic memory accesses, the computer system comprising:

logic, implemented by one or more processors, the logic being associated with a region of memory and being configured to:
detect a potential non-deterministic event corresponding to at least two or more concurrent asynchronous operations performed on each of two or more buffer constructs that are associated with the region of memory by comparing, during a merge operation that follows one or more prior clone operations, memory addresses accessed by each concurrent and asynchronous operation in the region of memory in order to make a determination as to whether the memory addresses accessed by each concurrent and asynchronous operation overlap in the region of memory; and
record the occurrence of the potential non-deterministic event.

13. The computer system of claim 12, wherein the logic is configured to detect the potential non-deterministic event by monitoring each of the two or more buffer constructs to determine whether corresponding tasks that use each of the two or more buffer constructs perform concurrent operations that collectively include at least one write operation.

14. The computer system of claim 12, wherein the logic is configured to detect the potential non-deterministic event by monitoring each of two or more tasks that individually operate on corresponding buffer constructs to determine whether the tasks use the corresponding buffer constructs to perform concurrent operations that collectively include at least one write operation.

15. The computer system of claim 12, wherein the logic is distributed to execute at least in part by individual buffer constructs.

16. The computer system of claim 12, wherein the logic maintains a data structure that records instances of individual operations performed on the region of memory.

17. The computer system of claim 12, wherein the logic maintains a data structure that records instances of potentially non-deterministic events that occur when the operations are performed on the region of memory.

* * * * *

UNITED STATES PATENT AND TRADEMARK OFFICE
CERTIFICATE OF CORRECTION

| | | |
|---|---|---|
| PATENT NO. | : 8,112,591 B1 | Page 1 of 1 |
| APPLICATION NO. | : 12/331362 | |
| DATED | : February 7, 2012 | |
| INVENTOR(S) | : Goodwin et al. | |

It is certified that error appears in the above-identified patent and that said Letters Patent is hereby corrected as shown below:

Title page, item (73), under "Assignee", in Column 1, Line 1, delete "Calos Fund," and insert -- Calos Fund --.

Signed and Sealed this
Seventh Day of August, 2012

David J. Kappos
*Director of the United States Patent and Trademark Office*